C. G. HAWLEY & E. K. BAKER.
PNEUMATIC TIRE MOUNTING.
APPLICATION FILED APR. 11, 1908.
915,954.
Patented Mar. 23, 1909.
4 SHEETS—SHEET 1.
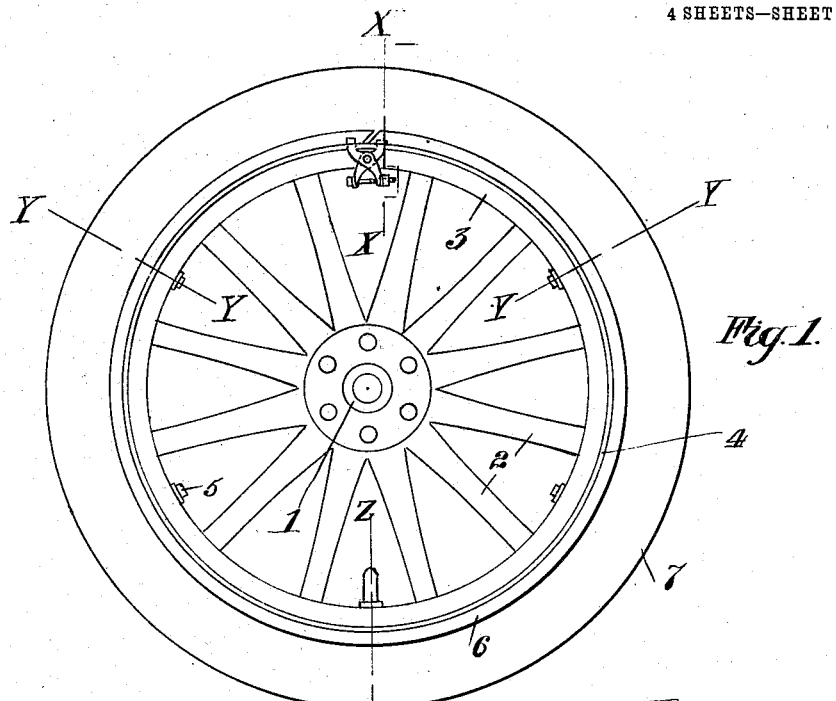
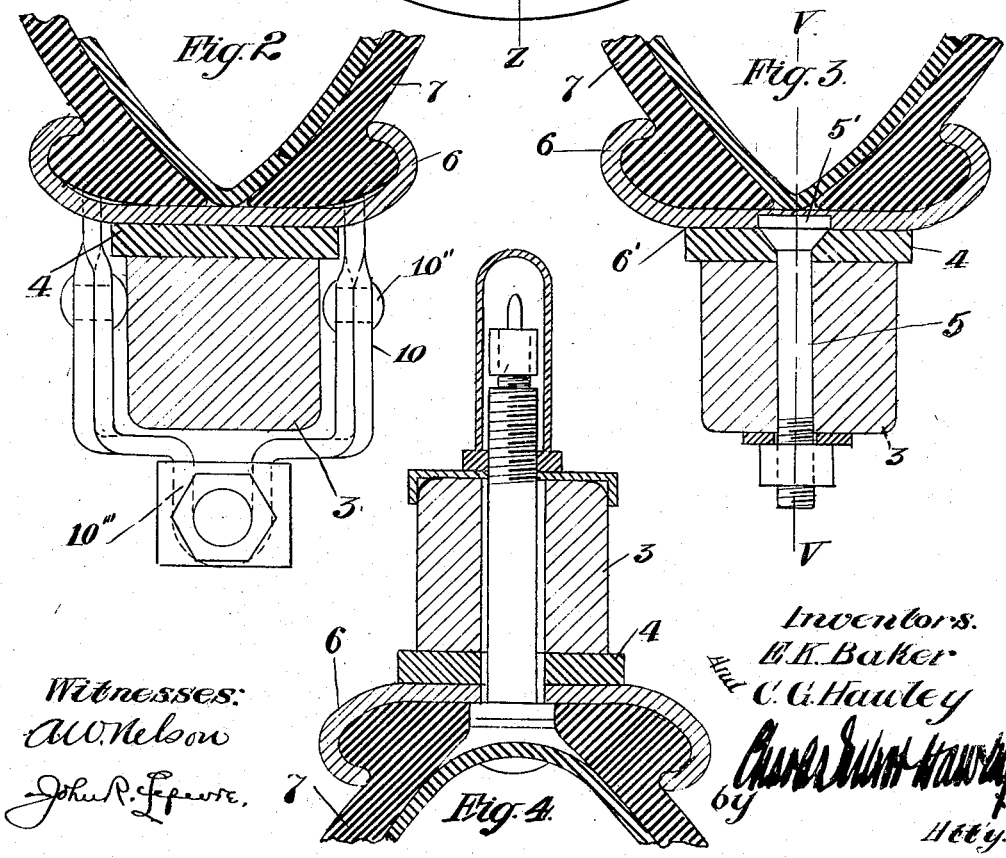

C. G. HAWLEY & E. K. BAKER.
PNEUMATIC TIRE MOUNTING.
APPLICATION FILED APR. 11, 1908.

915,954.

Patented Mar. 23, 1909.
4 SHEETS—SHEET 2.

Witnesses:
A. W. Nelson
John R. Lefevre

Inventors:
C. G. Hawley and E. K. Baker
by Charles Bond Hawley
Atty.

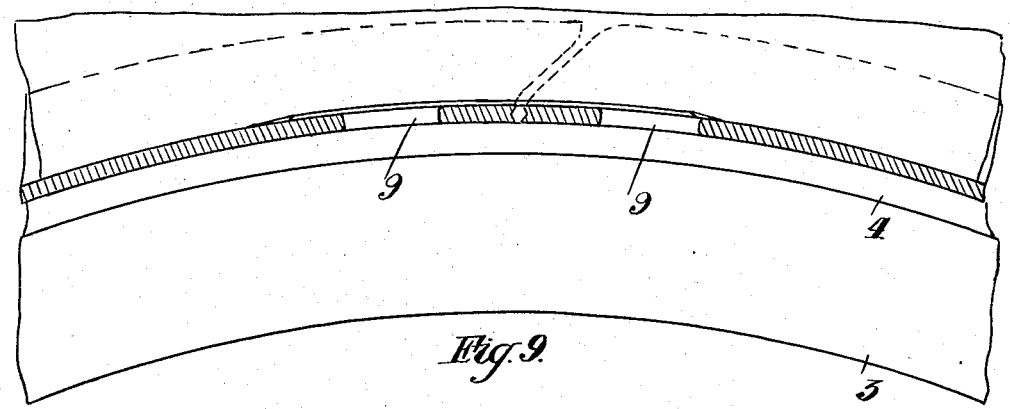
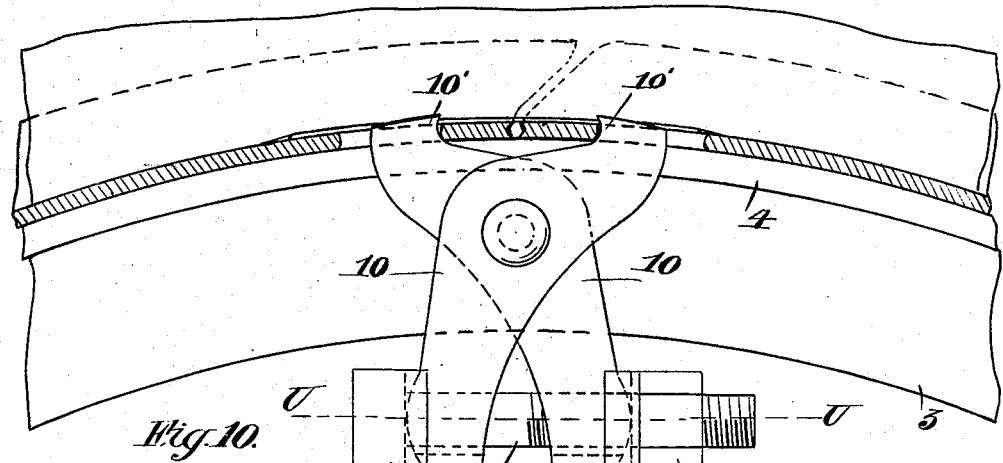
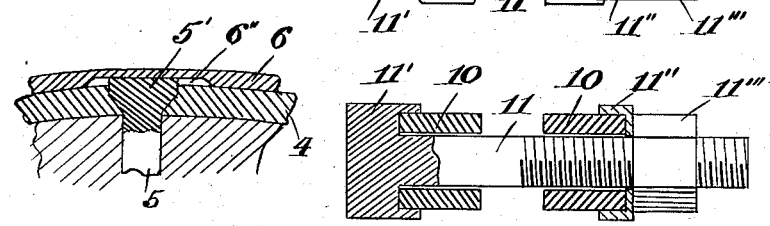
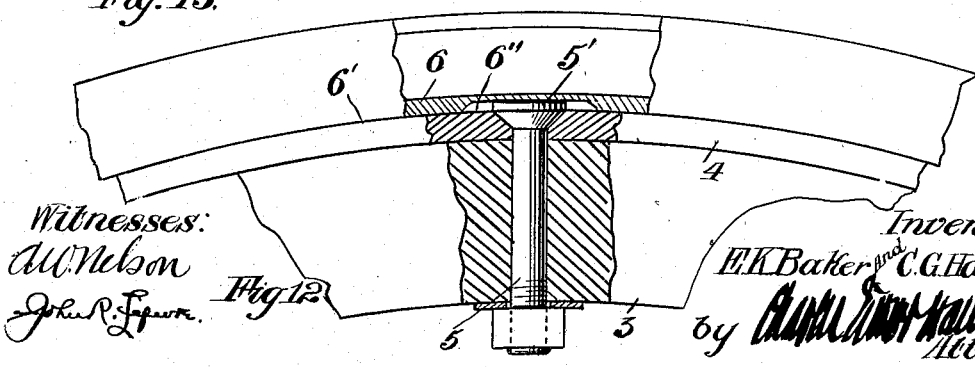

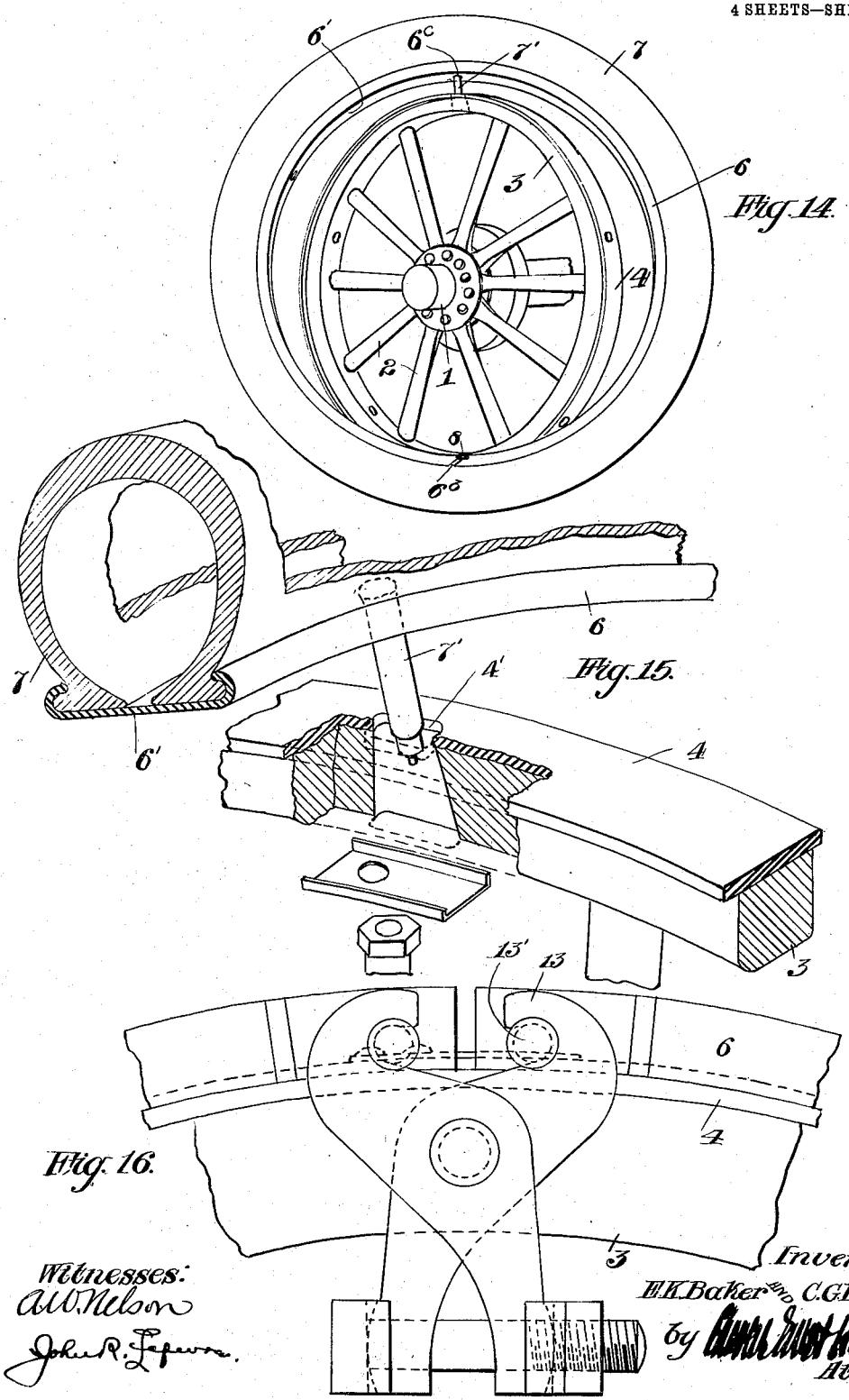

UNITED STATES PATENT OFFICE.

CHARLES GILBERT HAWLEY AND ERLE K. BAKER, OF CHICAGO, ILLINOIS.

PNEUMATIC-TIRE MOUNTING.

No. 915,954.　　　　　Specification of Letters Patent.　　　Patented March 23, 1909.

Application filed April 11, 1908. Serial No. 426,494.

*To all whom it may concern:*

Be it known that we, CHARLES GILBERT HAWLEY and ERLE K. BAKER, citizens of the United States, and residents of Chicago, Cook county, Illinois, have invented a certain new and useful Improvement in Pneumatic-Tire Mountings, of which the following is a full, clear, and exact description, such as will enable others skilled in the art to make and use the same.

Our invention relates to improved means for mounting or securing pneumatic tires upon wheels of automobiles and the like.

The object of our invention is to provide means by which either so-called non-expansible or expansible pneumatic tire casings may be quickly attached to or removed from such wheels.

A further object of the invention is to provide a tire mounting upon which a tire may be placed and inflated before it is applied to the wheel.

Another and special object of the invention is to employ the expansive force or pressure of the body of air within a pneumatic tire as the means of securing a tire mounting or rim upon the wheel.

Our invention consists, generally, in a wheel, in combination with a tire holding rim in the form of a split ring adapted to be clamped upon the wheel by the pressure of the pneumatic tire.

The invention also consists in various novel constructions and in combinations of parts, all as hereinafter described and particularly pointed out in the claims.

Figure 5:
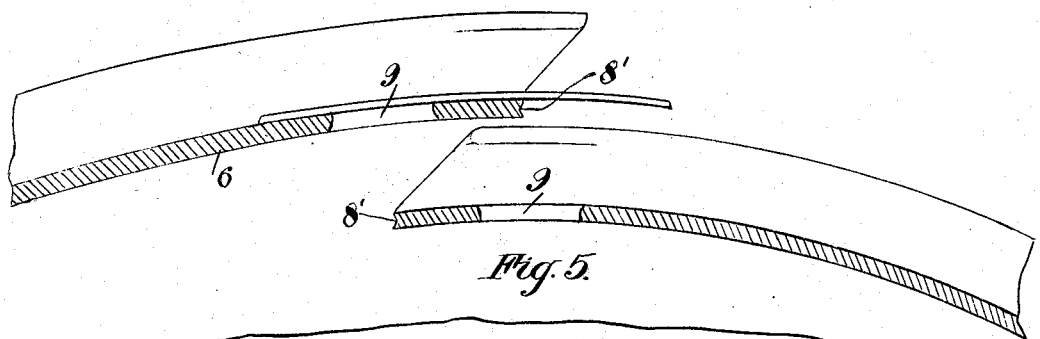
Figure 6:
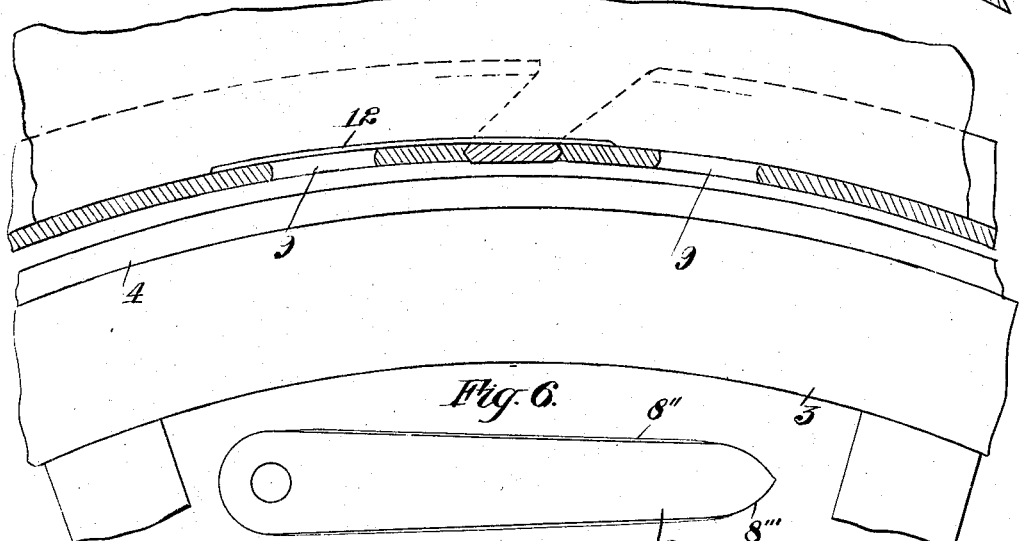
Figure 7:
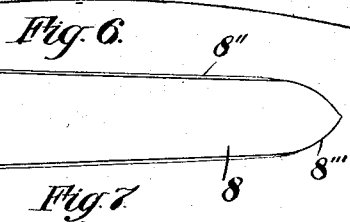
Figure 8:
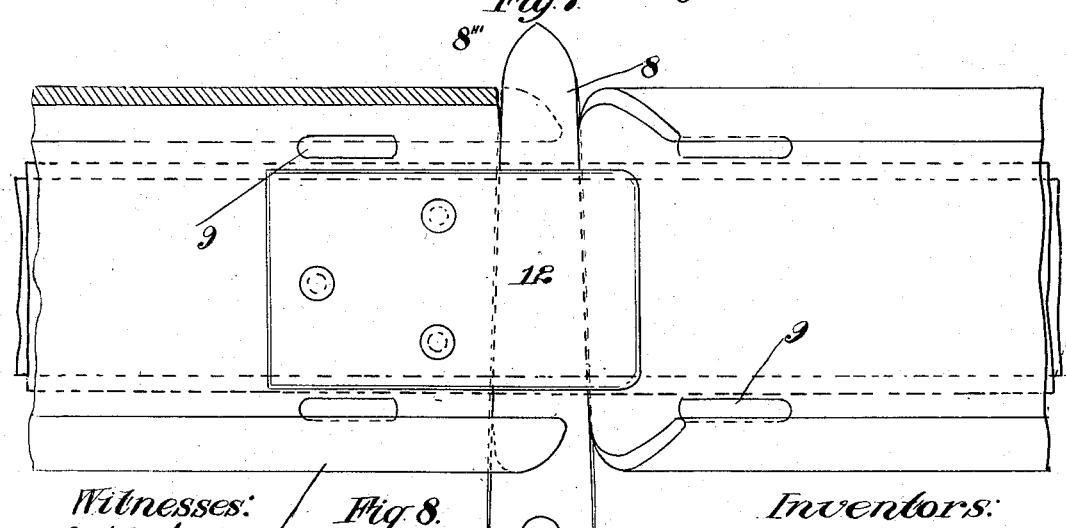

The invention will be more readily understood by reference to the accompanying drawings forming a part of this specification and in which;

Figure 1 illustrates a tire mounting embodying our invention; Fig. 2 is an enlarged sectional view on the line X—X of Fig. 1; Fig. 3 is a similar sectional view on the line Y—Y of Fig. 1; Fig. 4 is another section on the line Z—Z of Fig. 1; Fig. 5 is an enlarged longitudinal section of the rim, showing the ends thereof as they appear when the rim is contracted, preparatory to placing it within the tire; Fig. 6 is a similar view showing the rim expanded within the tire and secured in such relation, preparatory to being placed upon the wheel; Fig. 7 shows the wedge used to hold the rim expanded; Fig. 8 is a plan view of the rim taken from Fig. 6 and showing the wedge in place; Fig. 9 is like unto Fig. 6, but shows the wedge removed and the rim clamped upon the wheel by the pressure of the tire; Fig. 10 is like unto Fig. 9 and shows the supplementary clamping device or fastener by which the ends of the rim are fastened; Fig. 11 is a sectional view of the fastener on the line U—U of Fig. 10; Fig. 12 is a sectional view on the line V—V of Fig. 3; Fig. 13 is like unto Fig. 12 and shows a modified form of the tire bolt; Fig. 14 is a perspective view illustrating the manner of placing the tire and rim upon the wheel; Fig. 15 is an enlarged detail taken from Fig. 14 and better illustrating the manner of placing the valve stem of the tire in the wheel felly; Fig. 16 illustrates a modified form of the fastener.

Our invention, in one of its many possible forms, is completely illustrated or embodied in Figs. 1 and 14. As shown therein the wheel is made up of the usual hub, 1, the spokes, 2, the felly, 3, and the metal tire, 4. We shrink the tire, 4, on the wheel and additionally secure it by means of a number of tire bolts, 5. In all-metal wheels this construction is slightly changed, but not to such extent as to depart from or even necessitate a change in the invention. The cross sectional form of the metal tire, 4, is clearly shown in Figs. 2, 3, 4, 12, 13 and 15. All, or a certain number, of the tire bolts, 5, are provided with heads, 5', (see Figs. 3, 12 and 13) which project from the face of the tire. The preferred form of the bolt head is shown in Fig. 13; the cylindrical part of the head is accommodated in the tire, 4, and also projects from the face thereof. Save for the projecting heads, lugs or projections, 5', (which may be integral with the metal tire, 4,) the wheel, when completed by the application of the metal tire to the felly, is like an ordinary carriage wheel, and in emergencies can be used without the pneumatic tire and the rim.

It will be noted that the metal tire, 4, (in Figs. 1 to 15), has a flat face or flat periphery, substantially cylindrical, like an iron tired wagon or carriage wheel, and this is the form that we prefer.

Our demountable or detachable rim comprises a split ring, 6, adapted to hold the pneumatic tire casing or shoe, 7, after the manner of an ordinary wheel rim. The inner face, 6', of the rim conforms to the face of the tire or periphery, 4, of the wheel, and in the construction of Figs. 1 to 15, said inner face is provided with a plurality of slots or grooves, 6'', which fit the heads or projections, 5', on the wheel. When the rim is placed on the wheel, it is firmly interlocked therewith by the bolt heads or projections, 5', and is thereby held against lateral motion on the wheel. The cross sectional form of the rim, 6, is determined by the kind and shape of the tire to be used thereon. The rim is preferably split or cut on an angle, as shown at $6^b$, such form facilitating the collapsing of the rim. The rim is usually placed within the tire, 7, before either the rim or the tire is placed on the wheel and as will be presently explained, the tire when once mounted on the rim may be blown up or inflated, before being placed on the wheel. It is obvious that the outer diameter of the rim flanges exceeds the inner diameter of the pneumatic tire, 7, and to assemble the tire and rim, we collapse or contract the rim by passing one end beneath the other as indicated in Fig. 5. When thus contracted, the rim may be readily placed within the tire, 7, and being then allowed to expand, takes the base of the tire between its flanges. The opening, $6^c$, in the rim, for the valve stem of the tire, is placed directly opposite the split or opening, $6^b$, and it is an easy matter to position the valve stem in the rim. After placing the rim and tire together in this manner, we expand the rim until its diameter considerably exceeds that of the wheel, and then place the rim thereon.

To facilitate the placing of the rim on the wheel and also to adapt the rim to the very important use of a carrier for an inflated tire, we prefer to lock the ring open, that is, in expanded condition, and to hold the rim in such condition until it is lodged on the wheel. Various devices may be used for locking the rim in this manner, but we prefer the simple block or wedge, 8, shown in Figs. 6, 7, 8 and 14. If desired the ends of the rim may be provided with small grooves, 8', to receive the wedge, the latter in such case having V edges, 8''. This wedge may be used as the means for expanding the rim, but preferably it is slipped into place after the rim has been enlarged or expanded. It will be noted that the wedge has a sharp point, 8''', and it may be driven between the ends of the rim.

Attention is called to the fact that our rims do not need to be as heavy as ordinary automobile wheel rims, for the reason that they are simply applied to the metal tire on the wheel and are relieved from the duty of direct coöperation with the felly and spokes of the wheel. The lighter rims that we provide for pleasure vehicles, do not even require the use of a collapsing or contractive tool to put them into a tire or remove them from the wheel it being possible to open and close them by hand.

When the rim is locked or blocked open, as by the wedge, 8, it is in effect an endless, non-compressible rim, and the tire mounted thereon may be inflated; and carried from place to place in such condition, in readiness to be placed upon the wheel of the automobile at a moment's notice. It is obvious that a deflated tire may be carried on the rim in the same manner but would require inflation after being placed on the wheel.

The manner of placing the rim and tire on the wheel is shown in Fig. 14. The wheel is provided with a valve stem slot, 4', of such form that the stem may be inserted therein at an angle. The rim is turned at an angle to the wheel (see Fig. 14) and the valve stem, 7', is dropped into the slot; in other words, we, preferably, do not attempt to at once push the tire and rim onto the wheel, but first drop the stem through the hole, 4', and then force the opposite side of the rim upon the wheel. When thus positioned the rim may be swung or turned upon the diametrical axis afforded by the two points of contact with the wheel corresponding to a line drawn through the valve stem and the center of the wheel, and being, at such time of larger diameter than the wheel, the rim is easily swung into place thereon. In this last position the rim loosely fits the wheel, and upon the extraction of the block or wedge, 8, closes or clamps thereon. The natural resilience of the rim causes it to hug the periphery of the wheel and insures the proper engagement of the bolt heads, in the slots, 6'', of the rim. The moment that the wedge is removed, the highly compressed body of air within the tire mounted thereon, acting toward the center of the wheel, forcibly clamps the rim upon the wheel; the parts at such times literally comprising a compressed air clutch. The pressure of air generally approximates eighty pounds to the square inch and this pressure acting through the area of the tire base and rim, tends to contract or collapse the rim. The aggregate force thus at hand to clamp the rim on the wheel varies from eight thousand to twenty thousand pounds, according to the size of the pneumatic tire.

It will now be obvious that the various mechanical devices hitherto and hereinafter referred to as intended to prevent lateral movement of the rim on the tire are of a precautionary character, their chief use being to prevent the displacement of the rim when the tire is deflated. Even at such times the valve stem which passes through both the rim and the wheel felly prevents the slipping of the rim on the wheel and it and the bolt heads prevent lateral displacement. But for absolute security we prefer to lock the ends of the rim together at the time that the rim is placed on the wheel and when it has been clamped thereon by the pressure of the tire. For this purpose we preferably use the simple tongs-like device, shown in place in Fig. 1 and in detail in Figs. 2, 10 and 11. Near the ends of the rim we provide slots, 9; a pair thereof in each end, adjacent to the edges of the metal tire, 4. The clamping or locking device is formed of two members, 10, 10, having hooked ends, 10', for placement in the slots, 9, (see Figs. 2 and 10). The members are joined by pivotal rivets, 10'', and each member has a loop portion, 10''', to contain the bolt, 11. Curved or ball surfaces are provided between the members, 10, and the bolt head, 11', and follower, 11'', to prevent the distortion of the bolt. After the rim is clamped on the wheel by the pressure of the tire and its own resilience, the tongs are placed in position and the nut, 11''', is tightened on the bolt, thereby forcibly locking the ends of the rim on the wheel and even adding tensile strain, to effectively fasten it thereon. The engagement of the sides of the tongs with the edges of the tire, 4, prevent lateral displacement of the ends of the rim and make it unnecessary to locate bolt heads adjacent to said ends. The rim when thus secured upon the wheel becomes in effect a part of the wheel and is then the full equivalent of the ordinary endless wheel rim. It will be evident that the rim is adapted for employment with tires having either stretchable or non-stretchable base flanges or beads.

Figs. 5, 6, and 8 disclose the tongue, 12, applied to one end of the rim and lapping upon the other to bridge the gap between the ends and properly support the flanges and the inner tube of the pneumatic tire.

Fig. 16 illustrates a modified form of the tongs device, wherein the tongs are provided with hooks, 13, to engage the lugs, 13', extending from the flanges or sides of the rim.

As various modifications of our invention will readily suggest themselves to one skilled in the art, we do not confine or limit our invention to the specific structures herein shown and described.

Having thus described our invention we claim as new and desire to secure by Letters Patent:—

1. A wheel having a substantially flat, i. e. cylindrical periphery, provided with spaced rim interlocking projections, in combination with a tire-holding, demountable, flanged rim, in the form of a split ring, having its inner periphery fitted to that of the wheel and adapted to interlock with the projections thereof, said rim being adapted for contraction on the wheel by a pneumatic tire, and auxiliary rim end fastening means adapted to permit the automatic contraction of the rim by the tire thereon but preventing other than intentional expansion and unlocking of the rim, substantially as described.

2. A demountable, inflated-tire-holding, flanged wheel-rim, in the form of a split ring having a substantially cylindrical inner periphery containing a plurality of interlocking recesses spaced therein at intervals, with respect to the split in the rim, to interlock with complementary parts on the wheel, and said rim having holes in its ends for the reception of a fastening device formed to prevent the expansion of the rim by said device, substantially as described.

3. A wheel having a substantially flat, i. e. cylindrical periphery containing a valve stem opening and provided with a plurality of interlocking projections spaced about its periphery, in combination with a demountable, tire holding, flanged rim, in the form of a split ring seated on said periphery and containing a valve stem hole and complementary interlocking recesses and rim end clamping means on said wheel, diametrically opposite the valve stem openings in the rim and wheel, adapted to fasten the ends of the rim against expansion on the wheel, substantially as described.

4. A wheel, in combination with a rim having integral tire holding flanges and open at one point for expansion and contraction on the wheel, bifurcated tongs adapted to straddle the felly of the wheel and join the ends of said rim and a bolt for working said tongs to contract or tension the rim, substantially as described.

5. A demountable, flanged, pneumatic tire holding rim and a wheel, having substantially flat, i. e. cylindrical, contacting complementary peripheries provided with spaced complementary recesses and projections, said rim being in the form of a split ring and rim end fastening means joining the ends of the rim and securing the rim against other than intentional expansion on the wheel and permitting the constant automatic contraction of the rim on the wheel by an inflated pneumatic tire, substantially as described.

6. A wheel, in combination with a tire holding, flanged rim, in the form of a split ring, demountably interlocked with and upon the periphery of said wheel, and tensioning tongs having hooked ends engaged with the ends of said rim, substantially as described.

7. A wheel in combination with a tire holding, demountable, flanged rim in the form of a split ring, and adapted to be clamped upon the wheel by the pressure of a pneumatic tire, an adjustable tensioning device adapted for separable engagement with the ends of said rim, said tensioning device serving to draw said ends together and to prevent lateral movement thereof on the wheel, while permitting the constant contraction of the rim by the tire, substantially as described.

In testimony whereof, we have hereunto set our hands, this 28th day of March, 1908, in the presence of two subscribing witnesses.

CHARLES GILBERT HAWLEY.
ERLE K. BAKER.

Witnesses:
JOHN R. LEFEVRE,
M. SIMON.